Nov. 20, 1945.  W. W. WATKINS  2,389,286
APPARATUS FOR MARKING OR CUTTING PIPES
Filed Jan. 6, 1944  2 Sheets-Sheet 1

INVENTOR:
Wilfrid Weatherston Watkins
By John B. Brady
attorney.

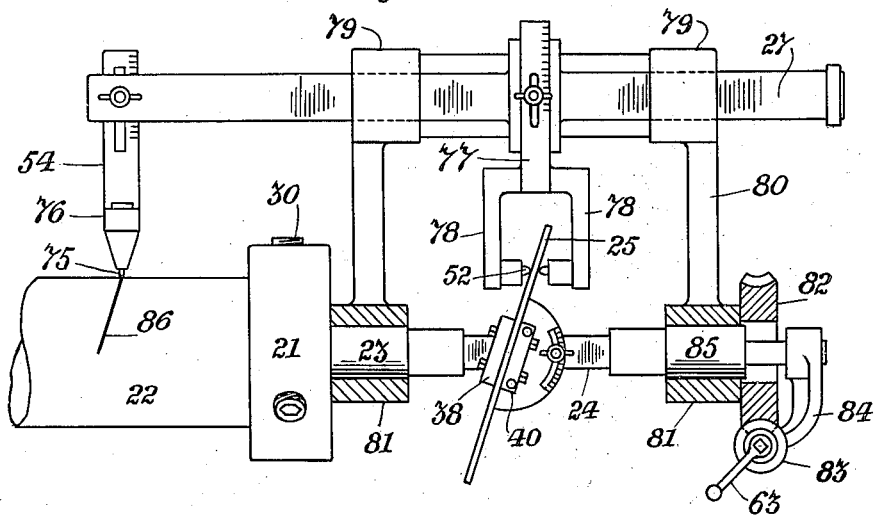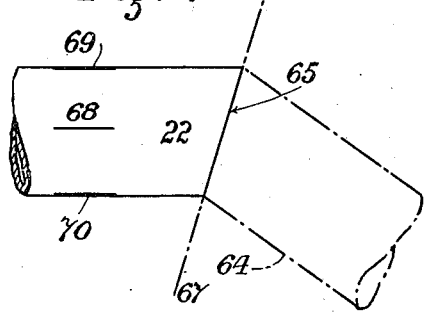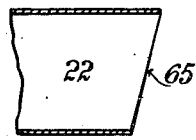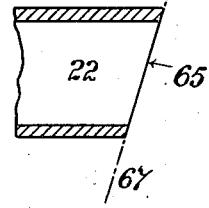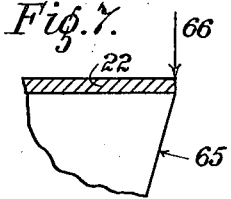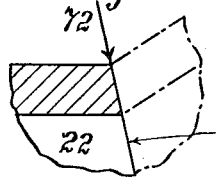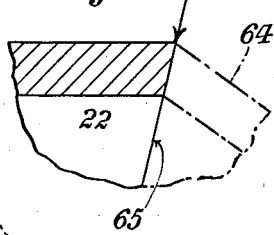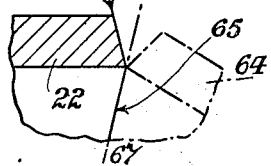

Patented Nov. 20, 1945

2,389,286

UNITED STATES PATENT OFFICE 2,389,286

APPARATUS FOR MARKING OR CUTTING PIPES

Wilfrid Weatherston Watkins, Helensburgh, Scotland

Application January 6, 1944, Serial No. 517,259
In Great Britain January 13, 1943

11 Claims. (Cl. 33—21)

This invention comprises an apparatus for use in cutting pipes or for use in marking off pipes preparatory to cutting same.

In laying pipes, for instance oil pipes, it is occasionally necessary to form an angle in the course of a pipe in order say to pass an obstacle. In order to form an angle adjacent ends of pipe lengths are cut in situ at predetermined oblique angles so that the said pipe lengths will lie at the required angle with respect to each other. Heretofore considerable time and much skill has been required in cutting the adjacent ends of adjacent pipes at the predetermined obliquities. Much of the requisite time and skill are involved in marking on the circumference of each pipe a line in an oblique plane along which line the pipe is subsequently to be cut.

An object of the present invention is to provide a portable apparatus usable in situ and adapted to deal with pipes of various sizes and for obliquities of any desired angularity by which both the time and the skill involved in marking on a pipe an oblique end will be much reduced.

Another object of the invention is to provide an apparatus as aforesaid by which an oblique end can be cut in a pipe at practically a single operation without need for preliminary marking of the line of cut.

The apparatus is or may be the same for marking and for cutting, except that a marking device is used for marking and a cutting device is used for cutting. As the operation performed in each case by the apparatus is in effect a forming operation, namely an operation of marking the form of an oblique end on a pipe or an operation of cutting an end of oblique form on a pipe, the apparatus for performing either or each of said operations is hereinafter and in the claims termed an "apparatus for forming an oblique end on a pipe" wherever the context so admits and the device whereby the form is marked or cut is correspondingly termed a "former."

Another object of the invention is to provide an apparatus for forming an oblique end on a pipe such apparatus to comprise the combination of an assembly which is adapted to be stationarily affixed on the end of the pipe and which therefore may be termed a stator, an assembly which is rotatable around said stator and the pipe and which therefore may be termed a rotor, a former which is a part of said rotor and is adapted to adopt a working position in relation to the pipe circumference, and a swash plate which is a part of the stator and therefore affixed to the pipe, and which can be set at the obliquity at which the pipe end is to be formed, the combination to be such that in the rotation of the rotor the former is carried thereby around the pipe and in the rotational movement is constrained by the swash plate to move also axially in conformity with the obliquity thereof. Thus, the formation due to the work of the former will be an obliquity parallel to the plane of the swash plate.

Another object of the invention is to provide, in an apparatus as aforesaid, a former which is radially adjustable to suit the diametral size of the pipe, so that the former will move around the swash plate in a track which in axial projection is circular and which in diameter is similar to the pipe.

Other objects of the invention will be apparent from the following specification and claims.

Fig. 1 is a sectional elevation of an apparatus according to this invention in which the "former" hereinbefore referred to is shown as a pipe cutter; and Fig. 2 is a corresponding plan.

Figs. 3 and 4 are sections approximately on the line 3—3 of Fig. 1, and the line 4—4 of Fig. 1, respectively.

Figs. 5 to 11 are diagrammatic sectional views of portions of pipes cut with oblique ends by the apparatus of the invention. Figs. 5, 6 and 8 are drawn to a small scale and Figs. 7, 9, 10 and 11 are drawn to a large scale.

Fig. 12 is an elevation of an apparatus according to the invention but incorporating various modifications.

Figure 1:
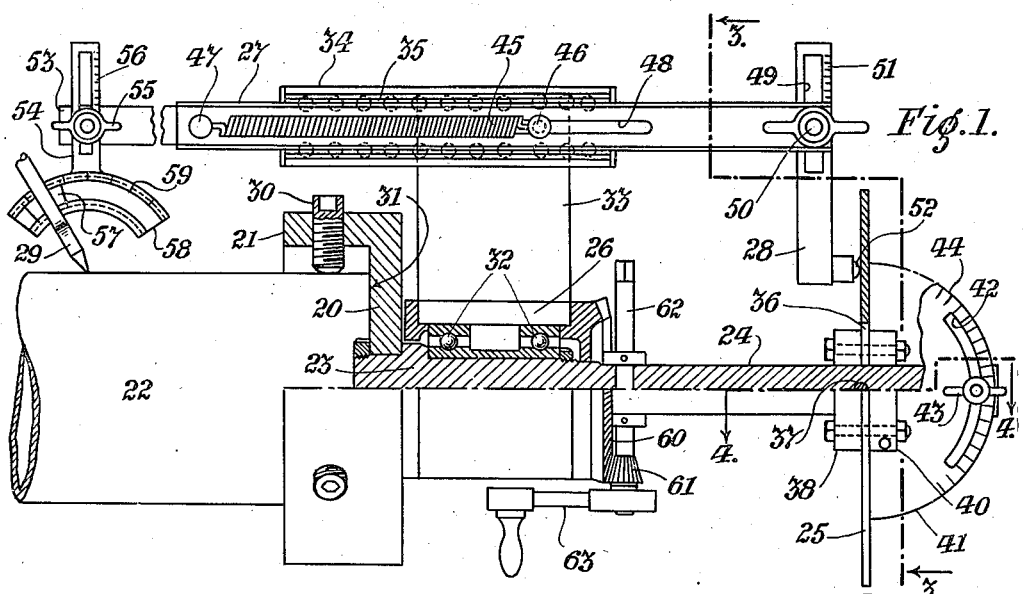

In Figs. 1 to 4 the invention is shown as applied to an apparatus for cutting oblique ends on pipes. As shown, the apparatus includes a stator of which the main components are a chuck 20, 21 securable to the extremity of a pipe 22 to be cut with an oblique end, a boss 23 extending centrally from the chuck, an axial extension 24 on the boss and an angularly adjustable swash plate 25 on the extension. As shown, the apparatus also includes a rotor of which the main components are a nave or central collar 26, a slider 27 which constitutes a holder, a finger 28 held at one end of the slider 27 and a cutter 29 held at the other end of said slider.

The said chuck consists of a circular plate 20 having on one face an annular peripheral flange 21. Threaded through said flange are three equi-spaced screws 30 which are manipulated to bite into the circumference of the pipe 22 close to the normal end face 31 thereof, flat and close against which the face of the chuck is placed, as Fig. 1 shows. Thus the stator can be affixed rigidly to the pipe in precise coaxial relationship therewith.

The boss 23 is formed on the other face of the plate 20, being fitted with ball-bearings 32 on which is mounted the nave 26 of the rotor. The nave 23 has a radial arm 33 to the outer end of which is secured a pair of wide inner channels 34 (see Fig. 3). A complemental pair of interconnected outer narrow channels 27 constitute the aforesaid slider, being slidably mounted on the inner channels 34. Between the flanges of the inner channels and the flanges of the outer channels four rows of balls 35 are interposed, so that the inner channels form a rigid anti-friction slideway for the slider. The pairs of channels extend axially, that is parallel to the common axis of the pipe, the stator and the rotor. Therefore the slider 27 is axially slidable with considerable freedom from friction but with rigid constraint by the slideway 34 against bending or skewing in its axial motion.

The swash plate 25 is a circular plate that is formed with a central slot 36 fitting neatly on the extension 24, the sectional form of which is square, the slot being long enough to permit the swash plate to be set at full obliquity in both directions. In order that the swash plate will be angularly adjustable, it is mounted on a trunnion pin 37 which extends transversely through the extension 24. Near the centre of the swash plate a group of four blocks 38, 38, 39 and 40 are secured to it. The blocks 38 are bolted to the face of the swash plate alongside the extension 24 and the trunnion-pin ends project between said blocks 38 and the swash plate. The blocks 39, 40 are at the rear of the swash plate, being secured alongside the extension 24 by the same bolts as the blocks 38. The block 40 serves also as mounting for a protractor 41, made as a semi-circular bracket, on the rear of the swash plate. The protractor has a slot 42 penetrated by a screw having a wing nut 43 by which the swash plate is locked to the extension 24 at any chosen obliquity to the axis thereof. A scale 44 on the rim of the protractor indicates the angle of obliquity of the swash plate. It will be seen that the adjustment of the swash plate is diametral; that is the axis of the pivotal connection 37 is a diameter of the circular swash plate.

The finger 28 cooperates with the face of the swash plate 25, hard against which the finger is continuously forced by the axial slider 27 under the pull of springs 45 which are anchored by a pin 46 to the arm 33 and are attached by a pin 47 to said slider. Slots 48 in the webs of the slider channels are penetrated by the anchorage pin 46 and permit the axial motion of the slider. The finger 28 has a slot 49 penetrated by a screw 50 on the slider, which screw has a wing nut to secure the finger to the slider. The arrangement is such that the finger can be radially adjusted, that is to and from the rotor axis. The finger has a graduated linear scale 51 indicative of the radial setting of the finger. The finger is fitted with an anti-friction steel ball 52 to give point contact with the swash plate, which provides for said ball a circular track around the axis of the rotor.

The opposite end of the slider 27 has an extension rod 53 which carries a short bar 54 having a slot penetrated by a screw with a wing nut 55. The arrangement is such that the bar 54 can be radially adjusted, that is to and from the pipe axis. The bar 54 has a graduated linear scale 56 indicative of the radial setting of said bar. The bar carries the pipe cutter 29, which in the example is an oxy-acetylene burner or torch. In the example the cutter 29 is mounted on a slide block 57 which is slidable in an arcuately slotted quadrant 58 on the bar 54. The quadrant has an angular graduated scale 59 indicative of the position of the block 57 in its slot and therefore of the angular relationship of the cutter 29 to the axis of the pipe.

The arrangement of the finger 28 and the cutter 29 is such that they act on the swash plate 25 and the pipe 22 respectively in the same axial plane, in the drawing the vertical plane containing the common axis of the pipe, stator and rotor; and in use of the apparatus the finger and cutter are radially adjusted to act at the same radial distance from said axis, as required by the diametral size of the pipe.

The apparatus has gearing by which to rotate the rotor. In the example the gearing comprises bevel wheel 60 secured to the rotor nave 26 and a bevel pinion 61 on a double-ended cross-shaft 62 journalled in the stator extension 24. A crank-handle 63 is provided for attachment to either end of the cross-shaft in order that a worker can rotate the rotor. As the handle 63 will foul parts of the rotor if the handle is retained on the same end of the cross-shaft, the handle must be unshipped prior to fouling and transferred to the other shaft end.

Figure 2:
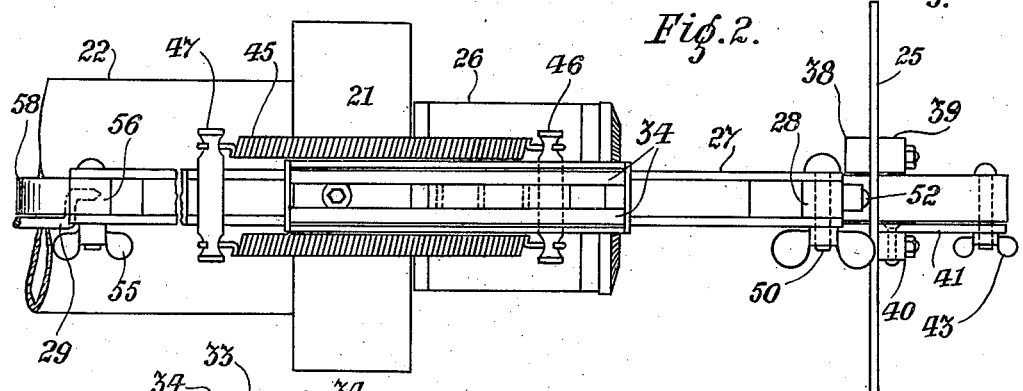
Figure 3:
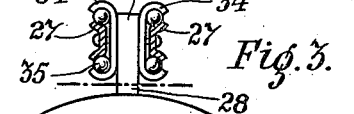
Figure 4:
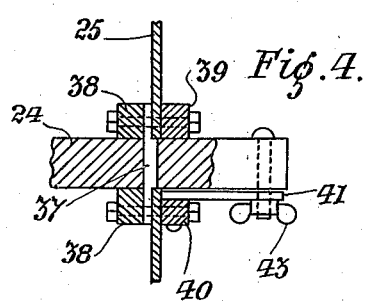

In Figs. 1 to 3, the swash plate 25 is shown in a zero or neutral setting. In use of the apparatus, the swash plate is pivotable about the diametral pin 37 in either direction into any desired angular setting.

In Figs. 1 and 2, the apparatus is shown with the protractor 41 and the crank-handle shaft 62 vertical. It may be found preferable in practice to set the apparatus with said parts 41 and 62 horizontal; that is, as though Fig. 1 were a plan view of the apparatus.

The apparatus is readily portable so that it can be moved about as required in the laying of a pipe line for use at places where workshop facilities are not available.

Referring now to Fig. 5, suppose that 22 represents a portion of a pipe line which is to be angularly deflected from its course as indicated by the inclined pipe portion 64 shown in dot-dash lines. The pipe 22 is cut with an oblique end 65 which gets welded to the adjacent end of the pipe 64, said adjacent end being cut at complemental obliquity.

Assume now that the pipe 22 has its initial normal end 31, as in Fig. 1, and is to be cut by use of the apparatus so as to have the oblique end 65. The chuck 20, 21 is secured by the screws 30 to the pipe in precise axial alignment therewith. The swash plate is angularly adjusted to precisely the same angle of obliquity as that at which the pipe is to be cut. The cutter 29 is radially adjusted inwards to the proper working distance from the pipe circumference; and the finger 28 is radially adjusted to the same extent. One worker manipulates the handle 63 and another controls the cutter, which is now set in action.

Suppose that the pipe is a thin one, for instance as indicated diagrammatically by Figs. 6 and 7. In that event the radially directed cutter may be angularly set and held with its slide block 57 in the central setting in the quadrant 58, as indicated by the arrow 66 in Fig. 7.

Suppose instead that the pipe is a thick one, for instance as indicated diagrammatically by Figs. 8, 9 and 10. In that event, in order that a satisfactory joint face may be provided at the pipe end, it may be desirable to cut the pipe at a progressively varying angle to the pipe axis such that the pipe end face lies in the plane 67, 67 of the oblique end. This progressive variation can be controlled manually with sufficient accuracy to suit practical requirements. To effect the angular variation, the worker grasps the radially directed cutter and slides the cutter block 57 to and fro in the quadrant 58 as cutting progresses in the rotation of the rotor. To aid the worker, longitudinal marks may be made on the pipe at positions of 0°, 90°, 180° and 270°, as indicated by the marks 68, 69 and 70 representative of 0°, 90° and 270°, respectively. Additional marks at intermediate angles may be made. At the commencement, the radially directed cutter then being at the 0° mark 68, the worker holds the cutter in the central position (as at 66 in Fig. 7). Then as cutting progresses he slides the cutter block 57 uniformly in the appropriate direction to attain the maximum displacement of the still radially directed cutter as indicated at 71 in Fig. 9 (equal to the angle of obliquity of the pipe end) when the 90° mark 69 is reached. Then he reverses the direction, returning the cutter block conformly to pass through the central position when the 180° mark is reached by the cutter, and continuing until the opposite maximum displacement is attained when the 270° mark 70 is reached as indicated by 72 in Fig. 10. Finally, he again reverses the cutter, returning it uniformly to attain the central position when the 360° or 0° mark 68 is reached.

In the last-mentioned mode of controlling the angularity of the radially directed cutter, the worker varies the angular relationship between the cutter and the pipe axis with the object of maintaining the radial direction of cut in the oblique plane 67, 67 of the pipe end 65. Instead, in order to facilitate the subsequent welding operation, the worker may vary the angular relationship between the cutter and pipe axis with the object of maintaining the radial direction of cut at an appropriate acute angle to said plane. That is to say, the worker displaces the cutter to and fro through the same total angle while the work of cutting progresses, but he uses as the mid-position of the cutter not the zero mark of the quadrant scale 59 but a mark at the desired acute angle from the zero mark. The operation is illustrated diagrammatically by Fig. 11, in which arrow 73 indicates the radial direction of cut at mark 69 and 74 indicates the acute angle between said direction and the plane 67, 67. As Fig. 11 shows, a groove of V-form in cross-section is provided in this way for welding material between the two pipes 22 and 64 to be welded together.

Thus it will be manifest that by mounting the cutter on the angularly adjustable slide block 57, the cutter has a pivotal mounting on its holder 27 so as to be angularly adjustable to cut in the pipe an end face of chosen angularity to the plane of obliquity 67, 67 of the pipe end. The chosen angle may be zero, as Figs. 8, 9 and 10 show, or it may be an acute angle, as Fig. 11 shows.

In practice, the workers do not make a continuous cut around the pipe, because by so doing they would sever from the pipe the extremity thereof to which the apparatus is affixed. Instead, the workers leave say two short bridges of uncut metal at points 180° apart so that the pipe extremity is not severed by use of the apparatus. After the apparatus is detached from the pipe the bridges are cut by burning or otherwise.

The apparatus shown by way of example in Figs. 1 to 4 is open to modification in any one of various features illustrated collectively by Fig. 12, in which parts similar to those already described with reference to Figs. 1 to 4 have the same reference numerals.

In the first-mentioned example, the axially slidable part hereinbefore called a "former" is represented as a cutter which is angularly adjustable. Instead, the former may be directly secured to the axially adjustable holder arm 54, as Fig. 12 shows.

The former need not be a cutter; instead it may be a marker as indicated by Fig. 12 in which 75 denotes a spring-urged pencil in a holder 76 secured to the arm 54.

In the first-mentioned example, the slider 27 has a finger which is forced by spring action against the face of the swash plate 25. In the construction according to Fig. 12, the slider is positively moved in both directions by the swash plate itself, both sides of which are active, and springs are not used. As shown, the slider has a radially adjustable double-fingered arm 77 whose ball-ended fingers 78 engage opposite sides of the swash plate 25.

In the Fig. 12 construction, it is not so desirable that an anti-friction support be provided for the slider 27; as shown, the slider is mounted in axially spaced plain bearings 79 provided in a rotor frame 80. The rotor frame 80 is shown as having plain central bearings 81 journalled on the stator boss 23 and a journal 85 on the extension 24.

The gearing for turning the rotor comprises a gearwheel 82 secured to the outer of the bearings 81. The gearwheel is a wormwheel and meshes with a worm 83 journalled in a stationary bracket 84 on the extension 24, the worm-shaft being fitted with the handle 63.

In Fig. 12 the swash plate 25 is shown in an oblique setting, the line traced on the pipe 22 by the marker 75 being denoted by 86.

I claim:

1. A portable apparatus for forming an oblique end on a pipe comprising a central stator to be fixed to the end portion of the pipe and to extend away from the pipe coaxially therewith and a rotor journalled on said stator for rotation about the common axis of the stator and pipe, said stator having means for affixing it to the pipe end portion and a swash-plate track which encircles and is angularly adjustable on said stator so as to be in a plane of predetermined obliquity to said axis, and said rotor having an axially movable holder which in rotation with said rotor engages said track so as to move axially in conformity with the obliquity thereof and a former held by said holder in working relationship with the pipe so as to perform thereon the required oblique end forming operation under the control of said track and holder in the rotation of the rotor.

2. A portable apparatus for forming an oblique end on a pipe comprising a stationary structure adapted to be affixed to the end portion of the pipe and to extend away from the pipe, a support rotatably mounted on said stationary structure but restrained against lengthwise motion relative thereto, a former carried around said pipe by said support in the rotation thereof, said former being mounted on said support to move lengthwise of the pipe but being restrained against rotation relative to the support, and an oblique track secured to said structure to effect and control the lengthwise movement of said former in rotation of said support.

3. An apparatus as claimed in claim 2 in which the oblique track is presented by a circular plate having a diametral pivotal connection with said stationary structure, means for locking said plate in adjusted position about said pivotal connection and a protractor for indicating the obliquity of said plate.

4. An apparatus as claimed in claim 1 in which said track is presented by a circular swash-plate having a diametral pivotal connection with said stator, means for locking said plate in adjusted position about said pivotal connection and a protractor for indicating the obliquity of said plate.

5. A portable apparatus for making an oblique formation on a pipe near a normal end face thereof comprising a central stator, means on said stator for securing it to said end face so that the stator extends away from the pipe with its axis in alignment with the pipe axis, a rotor journalled on said stator for rotation around its axis and restrained against axial motion, co-operating gearwheels one of which is provided on the central stator and one of which is provided on the rotor, one of said gearwheels being turnable to rotate the rotor, a swash-plate track encircling said stator and secured thereto so as to be angularly adjustable in order to occupy any desired plane of obliquity to the stator axis, a holder carried by said rotor, said holder being arranged for axial movement but constrained against rotary movement relatively to the rotor, a follower on said holder engaging said track so as to move the holder axially in conformity with the obliquity of the track, and a former held by said holder in working relationship with the pipe so as to make the required oblique formation under the control of said track in the rotation of the rotor by operation of said gearing.

6. An apparatus as claimed by claim 5 in which the means for securing the stator to the normal end face of the pipe comprises a chuck provided centrally on the stator and adapted to come flat against said face, a flange on said chuck to encircle the pipe end and screws threaded through said flange to bite into the outer periphery of the pipe end.

7. A portable apparatus for cutting off an end portion from a pipe having a normal end face in order to form an oblique end face, such apparatus comprising a central stator, a chuck on said stator for securing it to the end portion to be cut off and against said end face so that the stator extends away from the pipe with its axis in alignment with the pipe axis, a rotor journalled on said stator for rotation around its axis, a swash-plate track diametrically secured to said stator so as to be angularly adjustable about a diameter of said track in order to occupy any desired plane of obliquity to the stator axis, a holder carried by said rotor, said holder being arranged for axial movement only in relation to the rotor, a follower on said holder engaging said track so as to move the holder axially in conformity with the obliquity of the track, and a former held by said holder in working relationship with the pipe so as to make the required oblique formation under the control of said track during the rotation of the rotor.

8. A portable apparatus for making an oblique formation on a pipe near a normal end face thereof comprising a stator, means on said stator for securing it to said end face so that the stator extends from the pipe with its axis in alignment with the pipe axis, a rotor journalled on said stator for rotation around its axis, a swash-plate track secured to said stator so as to be angularly adjustable in order to occupy a plane of obliquity to the stator axis, a holder carried by said rotor, said holder being arranged for axial movement relatively to the rotor, a follower on said holder engaging said track so as to move the holder axially in conformity with the obliquity of the track, and a former held by said holder in working relationship with the pipe so as to make the required oblique formation under the control of said track during rotation of the rotor.

9. An apparatus as claimed by claim 8 in which the means for securing the stator to the normal end face of the pipe comprises a chuck provided on the stator and presenting a face adapted to be seated against said normal end face, and screws threaded through said chuck to engage the outer periphery of the pipe end.

10. An apparatus as claimed by claim 8 in which the holder comprises a slide bar and the rotor has a slideway in which said bar is axially slidable but restrained against rotation relatively to the rotor, rollers being interposed between said bar and slideway.

11. An apparatus as claimed by claim 8 in which the swash-plate track is a member with a central opening through which the stator extends and in which a diametrical connection is provided between said member and the stator about which connection the angular adjustment of the member is effected.

WILFRID WEATHERSTON WATKINS.